US010099825B2

(12) United States Patent
Viale et al.

(10) Patent No.: US 10,099,825 B2
(45) Date of Patent: Oct. 16, 2018

(54) SYSTEM FOR ATTACHING TWO TUBULAR MEMBERS AND CONTAINER FOR LIQUIDS EQUIPPED WITH SAID ATTACHMENT SYSTEM

(71) Applicant: Guala Closures S.p.A., Alessandria (IT)

(72) Inventors: Luca Viale, Alessandria (IT); Marco Giovannini, Milan (IT)

(73) Assignee: GRUPPO CIMBALI S.P.A. (IT)

(*) Notice: Subject to any disclaimer, the term of this patent is extended or adjusted under 35 U.S.C. 154(b) by 516 days.

(21) Appl. No.: 14/652,030

(22) PCT Filed: Dec. 13, 2013

(86) PCT No.: PCT/IB2013/060904
§ 371 (c)(1),
(2) Date: Jun. 12, 2015

(87) PCT Pub. No.: WO2014/091455
PCT Pub. Date: Jun. 19, 2014

(65) Prior Publication Data
US 2015/0321800 A1    Nov. 12, 2015

(30) Foreign Application Priority Data

Dec. 13, 2012  (IT) .............................. MI2012A2129
Dec. 13, 2012  (IT) .............................. MI2012A2130

(51) Int. Cl.
*B65D 47/00*     (2006.01)
*B65D 47/06*     (2006.01)
(Continued)

(52) U.S. Cl.
CPC ........... *B65D 47/06* (2013.01); *B65D 1/0246* (2013.01); *B65D 41/16* (2013.01); *F16L 21/00* (2013.01); *F16L 37/084* (2013.01)

(58) Field of Classification Search
CPC ...... B65D 47/06; B65D 1/0246; B65D 41/16; F16L 21/00; F16L 37/084
(Continued)

(56) References Cited

U.S. PATENT DOCUMENTS 1,333,245 A      3/1920   Carson
1,742,941 A  *   1/1930   Susol ..................... B65D 41/62
                                                    215/251
(Continued)

FOREIGN PATENT DOCUMENTS

DE      202012010853 U1    11/2012
EP          1313649 B1     2/2008
(Continued)

*Primary Examiner* — Ernesto Grano
(74) *Attorney, Agent, or Firm* — Alan G. Towner; Leech Tishman Fuscaldo & Lampl (57) ABSTRACT

The present invention relates to an attachment system for attaching together two tubular members comprising two tubular members, rotational attachment members and longitudinal attachment members. The rotational attachment members comprise a plurality of attachment elements which are disposed in angularly spaced relationship along the first tubular member to define a plurality of seats between two successive attachment elements and a plurality of reference elements disposed in angularly spaced relationship along the second tubular member and at least partially accommodated in respective seats. The longitudinal attachment members comprise a plurality of stop surfaces disposed in angularly spaced relationship along the first tubular member and a plurality of abutment elements formed on the second tubular member, each abutment element extending in the longitudinal direction and cooperating with a respective stop surface. The invention also relates to a liquid container having said attachment system.

10 Claims, 11 Drawing Sheets

(51) Int. Cl.
*F16L 21/00* (2006.01)
*F16L 37/084* (2006.01)
*B65D 1/02* (2006.01)
*B65D 41/16* (2006.01)

(58) Field of Classification Search
USPC .................................................. 215/43
See application file for complete search history.

(56) References Cited

U.S. PATENT DOCUMENTS

| | | | | |
|---|---|---|---|---|
| 4,006,836 | A * | 2/1977 | Micallef | B65D 50/048 215/218 |
| 4,497,415 | A | 2/1985 | Delonghi | |
| 4,782,963 | A * | 11/1988 | Hunter | B65D 50/062 206/534 |
| 4,786,085 | A * | 11/1988 | Sauer | F16L 37/0985 285/24 |
| 4,887,849 | A * | 12/1989 | Briet | F16L 37/098 285/148.13 |
| 5,529,201 | A * | 6/1996 | Tallent | B60K 15/0406 220/298 |
| 5,829,641 | A * | 11/1998 | Bartsch | B05B 11/3059 222/153.13 |
| 5,927,531 | A | 7/1999 | Kuzma et al. | |
| 6,244,632 | B1 * | 6/2001 | Gasparini | F16L 37/084 285/330 |
| 6,328,349 | B2 * | 12/2001 | Bandlow | F16L 37/0985 285/319 |
| 6,467,817 | B1 * | 10/2002 | Rhyman | F16L 37/084 285/307 |
| 6,659,511 | B2 * | 12/2003 | Yoneyama | F16L 25/12 285/302 |
| 7,165,692 | B2 * | 1/2007 | Konefal | B65D 50/04 215/220 |
| 7,419,478 | B1 * | 9/2008 | Reilly | A61M 5/14546 604/218 |
| 7,942,287 | B2 * | 5/2011 | King | B65D 41/04 215/307 |
| 9,173,995 | B1 * | 11/2015 | Tucker | A61M 5/14566 |
| 9,365,330 | B2 * | 6/2016 | Londergan | B65D 41/02 |
| 9,586,736 | B2 * | 3/2017 | Goldberg | B65D 50/061 |
| 2001/0047976 | A1 * | 12/2001 | Frank | B65D 25/44 215/208 |
| 2009/0194500 | A1 * | 8/2009 | House | B65D 50/061 215/223 |
| 2016/0245435 | A1 * | 8/2016 | Corbett, Jr. | B29C 65/70 |

FOREIGN PATENT DOCUMENTS

GB 2273493 A 6/1994
WO 9804474 2/1998

* cited by examiner

SYSTEM FOR ATTACHING TWO TUBULAR MEMBERS AND CONTAINER FOR LIQUIDS EQUIPPED WITH SAID ATTACHMENT SYSTEM

FIELD OF THE INVENTION

The present invention relates to an attachment system for attaching two tubular members.

The present invention also relates to a liquid container equipped with said attachment system.

Particularly, the present invention may be used for attaching the neck of a liquid container to a tubular member that is part of a closure having a safety seal, or a pourer, which are designed to be stably attached to the container.

BACKGROUND INFORMATION

Containers with a tubular member attached to their neck are known, for example, from documents U.S. Pat. No. 4,497,415, WO 9804474 and EP 1313649. The step of attaching the tubular member to the neck is carried out automatically by capping machines, which apply a force in the direction in which the tubular member is fitted onto the neck, for the former to be stably attached to the latter.

While these technical solutions are suitable for glass container applications, they are found to be inadequate in plastic container applications. In the latter case, the container body is flexible and does not oppose an adequate resistance to the capping load to ensure attachment of the tubular body like in a glass container. For this reason, plastic containers, e.g. made of PET, have a finish arranged on the neck below the mouth. This finish allows the capping machine to grasp the finish using a fork, thereby acting as a resistance element opposing resistance to the capping load. Alternatively, the thickness of the container walls may be increased to withstand this capping load.

While the finish is useful from a structural point of view, it is certainly detrimental from an aesthetic point of view.

A further attachment system is disclosed in U.S. Pat. No. 5,927,531.

The above discussion of the prior art shows that there is still a need for an attachment system for attaching two tubular members that can provide such attachment with a reduced attachment load. Also, there is the need for a liquid container that allows attachment of the tubular member of a closure or a pourer to the neck of the container body with a reduced capping load and hence without using a finish and/or a container with thicker walls.

In view of the above discussed prior art, the object of the present invention is to fulfill the above need, while obviating the prior art drawbacks.

SUMMARY OF THE INVENTION

According to the present invention, this object is fulfilled by an attachment system for attaching two tubular members comprising a first tubular member extending along a longitudinal axis, a second tubular member extending along said longitudinal axis, and attached to said first tubular member, rotational attachment members for rotatably attaching said first tubular member to said second tubular member, longitudinal attachment members for attaching said first tubular member to said second tubular member in said longitudinal axis, wherein said rotational attachment members comprise a plurality of attachment elements formed on said first tubular member and arranged in angularly spaced relationship along said first tubular member to define a plurality of seats between two successive attachment elements, each seat being angularly delimited at its opposite sides by two successive attachment elements, a plurality of reference elements formed on said second tubular member, and arranged in angularly spaced relationship along said second tubular member and at least partially housed in respective seats of the attachment elements, each reference element cooperating with the two successive attachment elements defining the seat in which said reference element is at least partially housed, for rotatably attaching said first tubular member to said second tubular member, said longitudinal attachment members comprise a plurality of stop surfaces formed on said first tubular member and arranged in angularly spaced relationship along said first tubular member, a plurality of abutment elements formed on said second tubular member, each abutment element extending along the longitudinal axis and cooperating with a respective stop surface for longitudinally attaching said first tubular member and said second tubular member, each abutment element being defined by a tab attached to the second tubular member at a base portion thereof, said tab radially extending from the base portion to an end portion, at least part of the tab being elastically deformable along an axis transverse to the longitudinal axis.

In an aspect of the present invention, said transverse axis lies on a plane perpendicular to said longitudinal axis.

In another aspect of the present invention, said at least part of the tab comprises at least said end portion.

In a further aspect of the present invention, said tab extends along the longitudinal axis between an upper portion and a lower portion, said upper portion of the tab engaging with a respective stop surface.

In another aspect of the present invention, said tab extends on a plane parallel to said longitudinal axis.

In a further aspect of the present invention, from a configuration in which said second tubular member is released from said first tubular member, said second tubular member is coupled to said first tubular member by a coupling movement along said longitudinal axis and in a coupling direction, said tab progressively bending from the lower portion toward the upper portion during said coupling movement.

In another aspect of the present invention, said bending of the tab allows the end portion to pass through a respective seat and the second tubular member to move relative to said first tubular member until said tab snaps underneath the respective stop surface thereby said upper portion of the tab engages said respective stop surface.

In a further aspect of the present invention, said attachment elements project out of the first tubular member toward said second tubular member and comprise two opposed attachment surfaces, said reference elements project out of the second tubular member toward said first tubular member, each reference element having two opposed reference surfaces engaging with respective attachment surfaces of two successive attachment elements.

In another aspect of the present invention, each reference element comprises a projection that extends from the second tubular member on a plane perpendicular to said longitudinal axis.

In a further aspect of the present invention, the stop surfaces are arranged in longitudinally offset relationship to said attachment elements.

In another aspect of the present invention, said stop surfaces lie on a plane perpendicular to the longitudinal axis.

In a further aspect of the present invention, each attachment element comprises two opposed lead-in surfaces.

In another aspect of the present invention, said first tubular member and said second tubular member lie one over the other at least along a longitudinal portion thereof.

In a further aspect of the present invention, said first tubular member is a neck portion of a liquid container and said second tubular member is a part of a closure or a pouring device, said second tubular member being coaxially disposed outside said neck.

In another aspect of the present invention, said first tubular member and said second tubular member define parts of a closure for a liquid container.

In a further aspect of the present invention, said longitudinal attachment members are designed to provide an irreversible attachment along the longitudinal axis in the direction of separation of said first tubular member from said second tubular member and vice versa.

In a further aspect of the present invention, the object is fulfilled by a liquid container comprising a liquid container comprising a container body having a neck, said neck extending from the container body along a longitudinal axis and ending with a mouth that defines an orifice, a tubular member, particularly of a closure or a pourer, disposed around said neck, attached to said neck and having an inner surface facing said neck and an outer surface, rotational attachment members for rotatably attaching said tubular member to said neck, longitudinal attachment members for attachment of said tubular member to said neck along said longitudinal axis, wherein said rotational attachment members comprise a plurality of attachment elements formed on said neck and arranged in angularly spaced relationship along said neck to define a plurality of seats between two successive attachment elements, each seat being angularly delimited at its opposite sides by two successive attachment elements, a plurality of reference elements formed on said inner surface of the tubular member, and arranged in angularly spaced relationship along said tubular member and at least partially housed in respective seats of the attachment elements, each reference element cooperating with the two successive attachment elements that define the seat in which said reference element is at least partially housed, for rotatably attaching said tubular member to said neck, said longitudinal attachment members comprise a plurality of stop surfaces formed on said neck and arranged in angularly spaced relationship along said neck, a plurality of abutment elements formed on said inner surface of the tubular member, each abutment element extending along the longitudinal axis and cooperating with a respective stop surface for longitudinally attaching said tubular member to said neck, each abutment element being defined by a tab attached to the inner surface of the tubular member at a base portion thereof, said tab radially extending from the base portion to an end portion, at least part of the tab being elastically deformable along an axis transverse to the longitudinal axis.

Preferably, from a configuration in which said tubular member is released from said neck, said tubular member is coupled to said neck by a coupling movement along said longitudinal axis and in a coupling direction, said tab progressively bending from the lower portion toward the upper portion during said coupling movement.

Preferably, said bending of the tab allows the end portion to pass through a respective seat and the tubular member to move relative to said neck until said tab snaps underneath the respective stop surface thereby said upper portion of the tab engages said respective stop surface.

Preferably, said attachment elements project out of the neck toward said tubular member and comprise two opposed attachment surfaces lying on planes parallel to the longitudinal axis, said reference elements project out of the tubular member toward said neck, each reference element having two opposed reference surfaces engaging with respective attachment surfaces of two successive attachment elements.

Preferably, each reference element comprises a projection that extends from the tubular member on a plane perpendicular to said longitudinal axis.

Preferably, said attachment members are formed at said mouth.

Preferably, the stop surfaces are disposed below the attachment members with respect to the orifice.

Preferably, said stop surfaces lie on a plane perpendicular to the longitudinal axis.

Preferably, each attachment element comprises two opposed lead-in surfaces.

Preferably, said longitudinal attachment members are designed to provide an irreversible attachment along the longitudinal axis in the direction of separation of said tubular member from said neck vice versa.

BRIEF DESCRIPTION OF THE DRAWINGS

FIGS. 3a to 7a show plan views of the container part as shown in FIGS. 3 to 7 from the interior of the neck, FIGS. 3b to 7b show plan views of the container part as shown in FIGS. 3 to 7 from the bottom.

Figure 1:
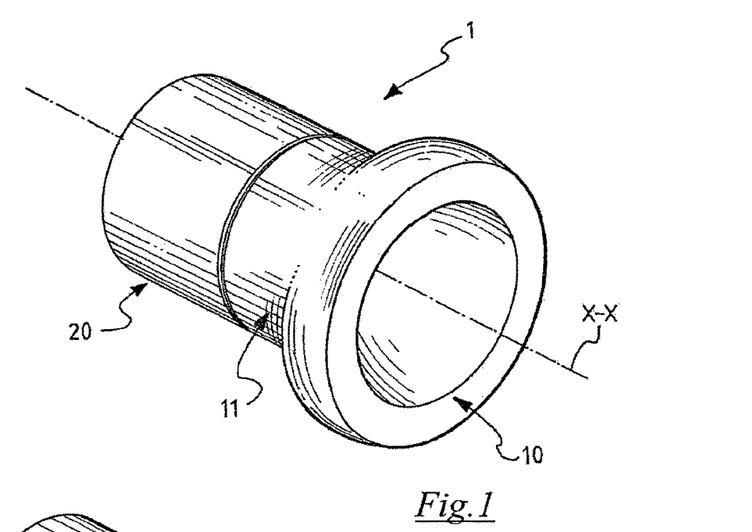
FIG. 1 shows a perspective view of the upper portion of a liquid container having two tubular members, namely the container neck and a closure part, which are attached together by the attachment system of the present invention.
Figure 2:
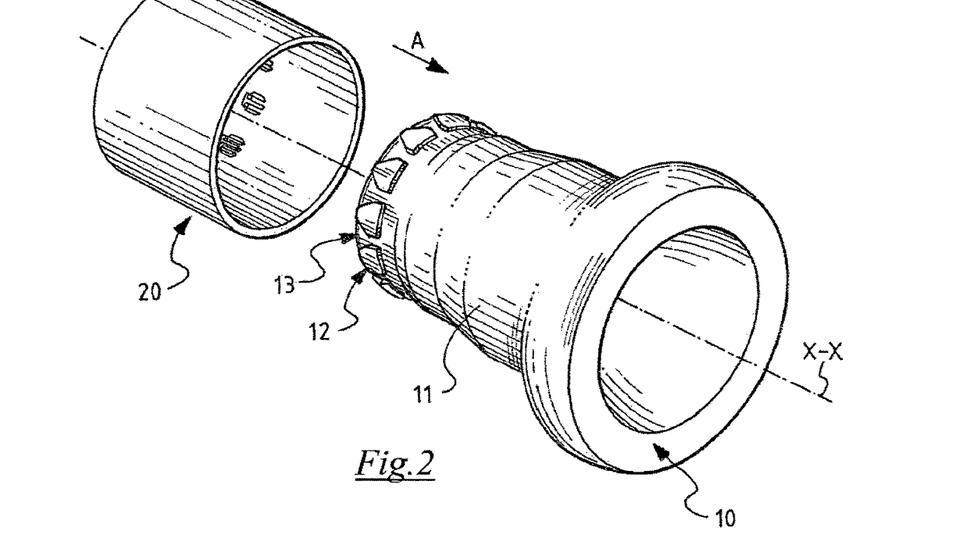
FIG. 2 shows a perspective view of FIG. 1, with the tubular member of the closure in a free position, i.e. not attached to the container neck.
Figure 3:
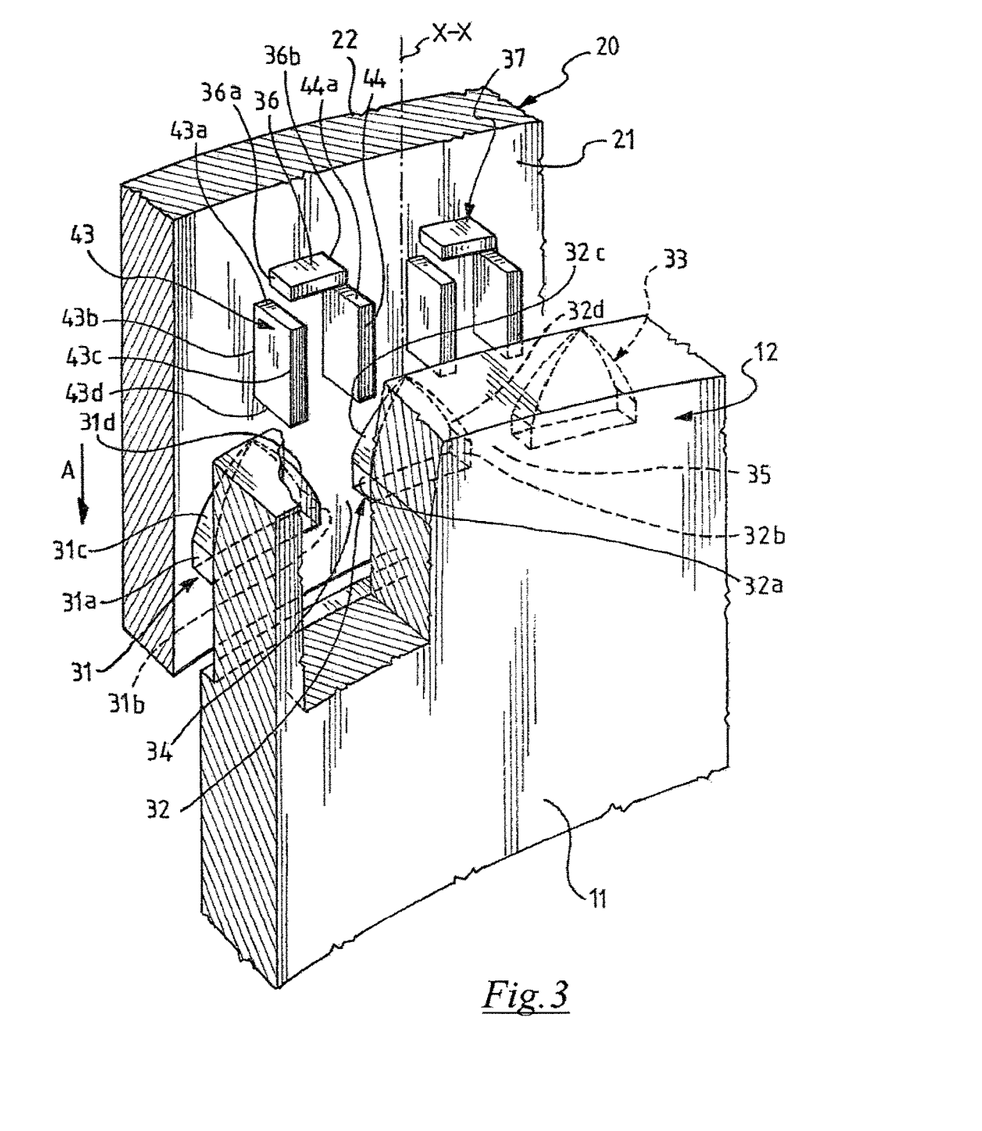
FIGS. 3 to 7 show successive perspective views of a part of the container of FIG. 1 during assembly of the tubular member of the closure to the container neck.
Figure 3A:
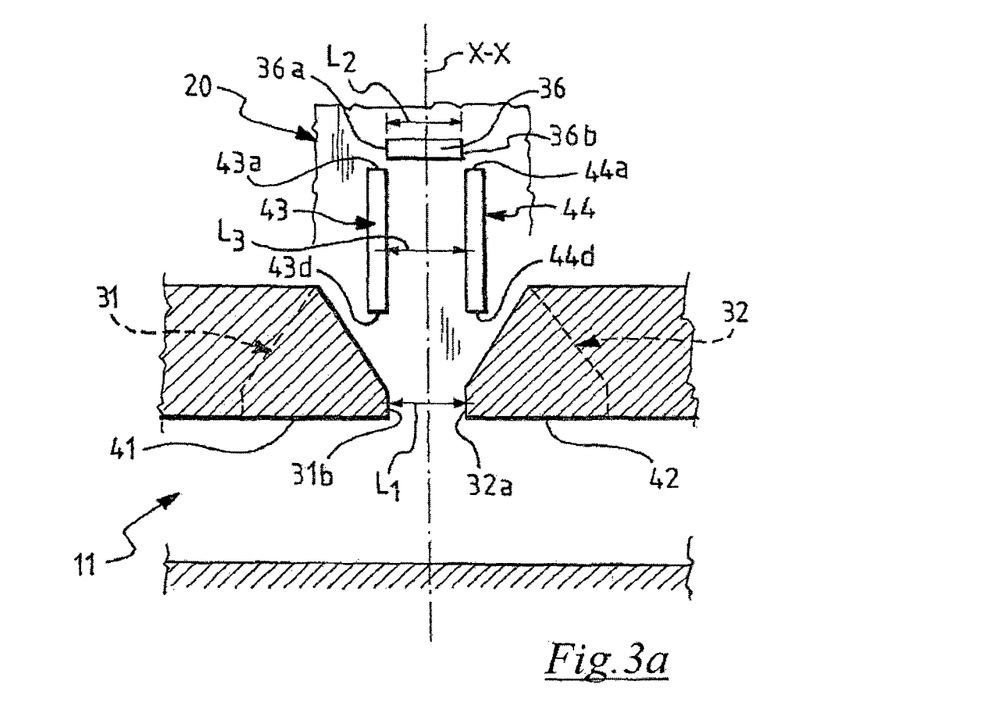
Figure 3B:
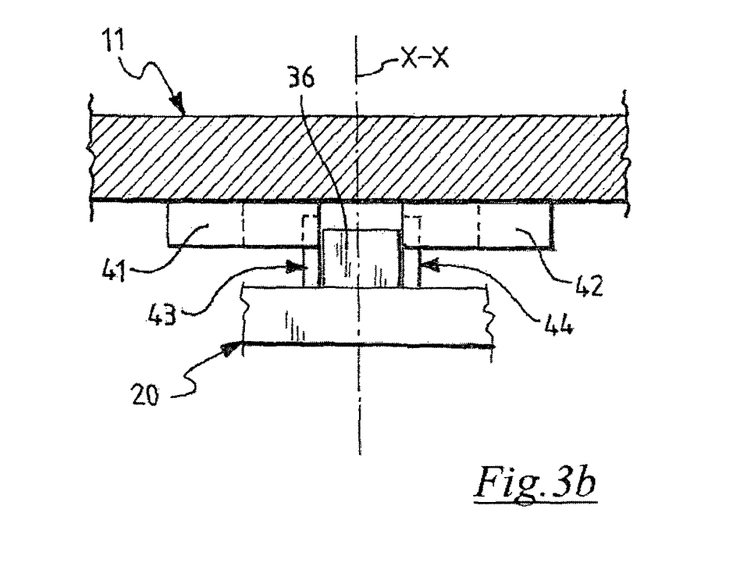
Figure 4:
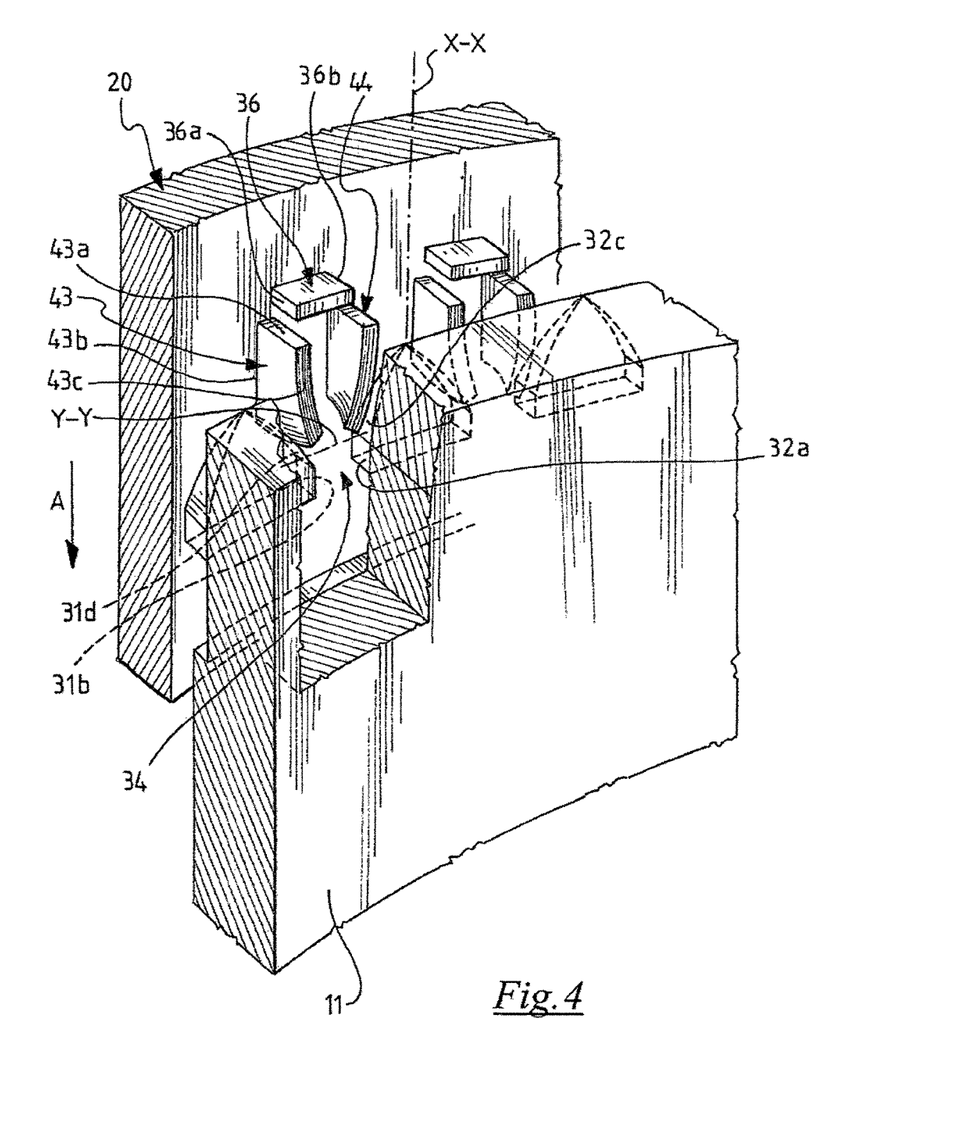
Figure 4A:
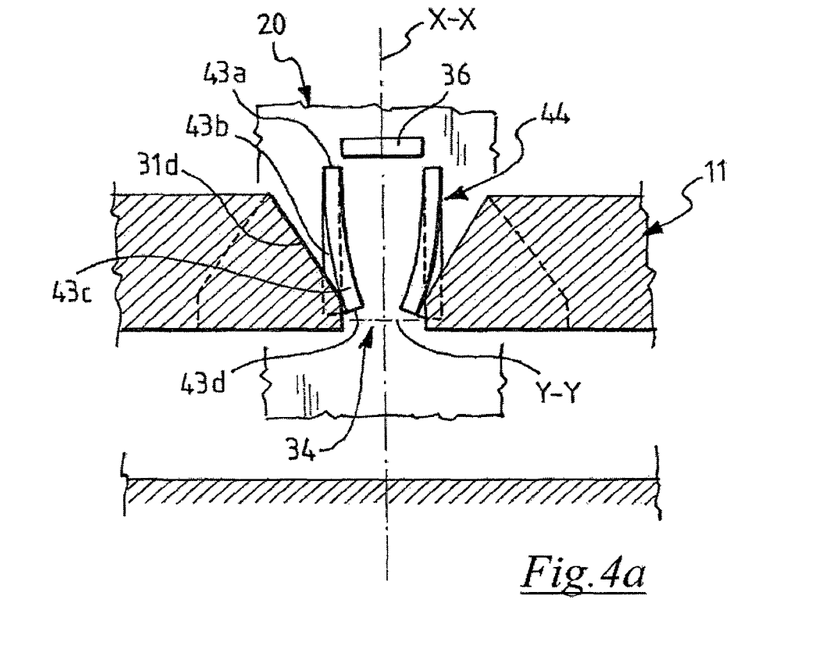
Figure 4B:
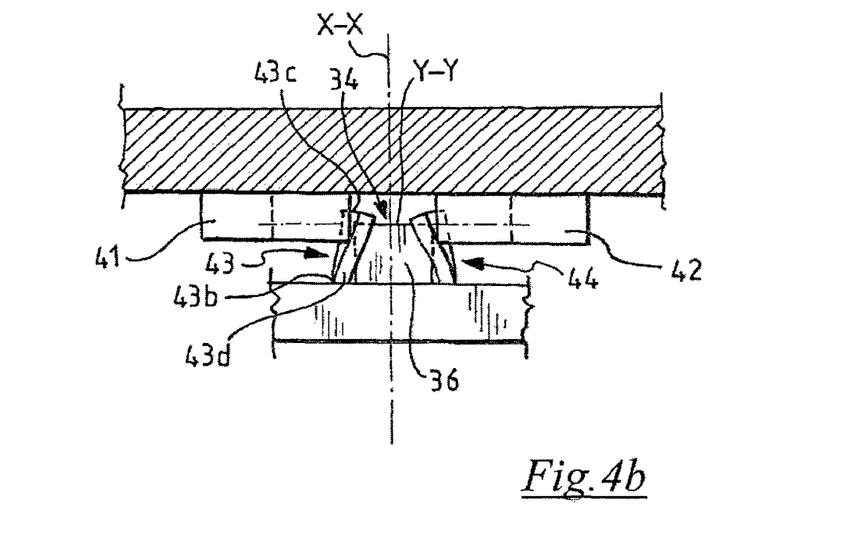
Figure 5:
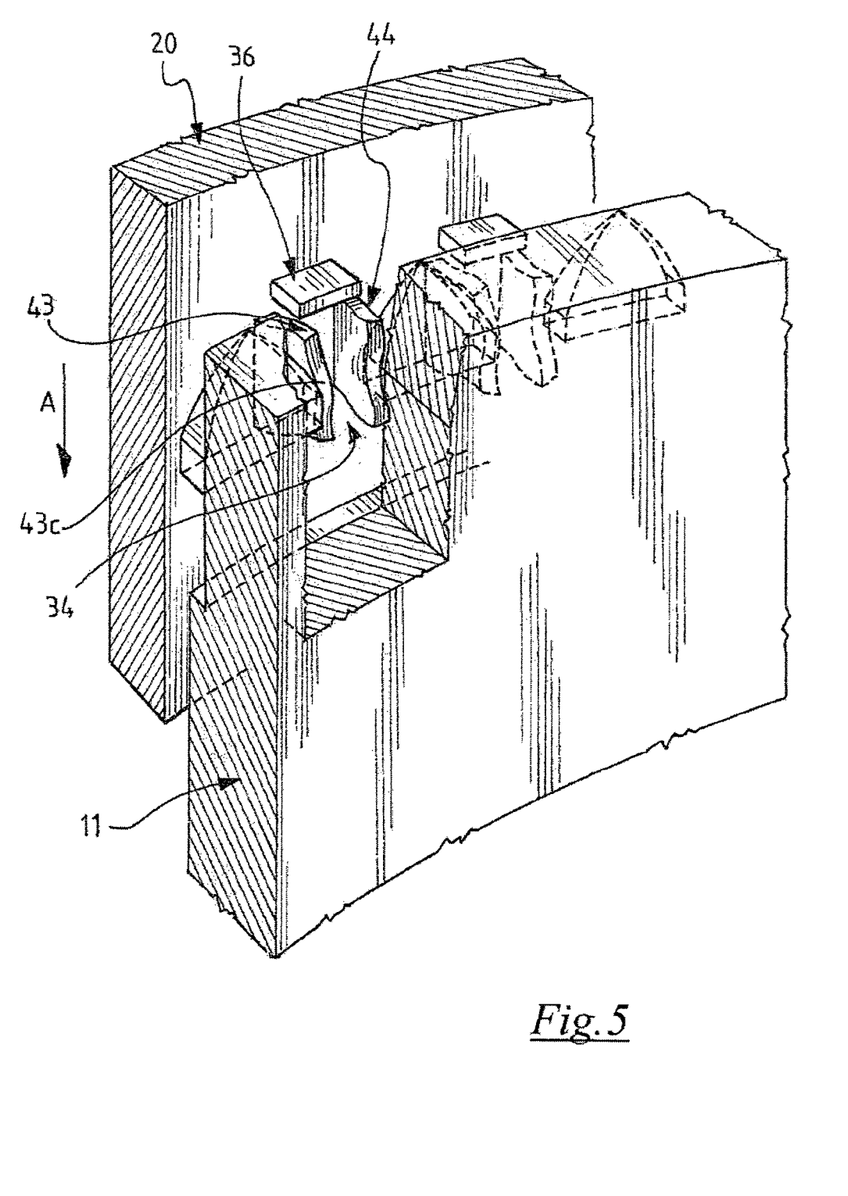
Figure 5A:
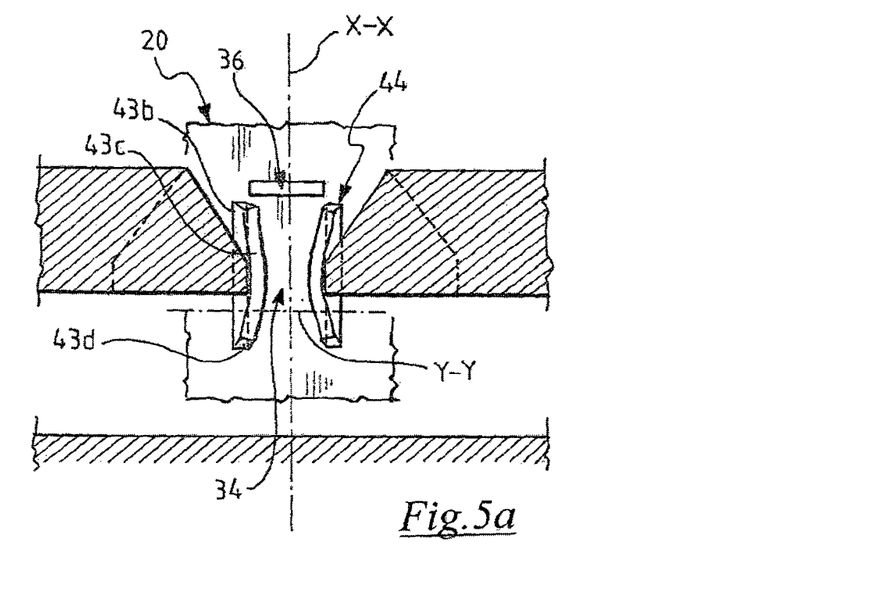
Figure 5B:
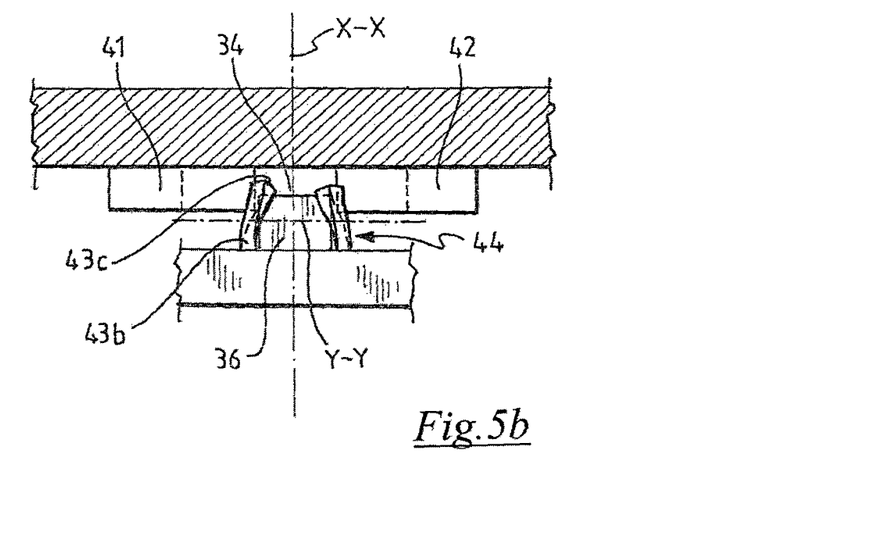
Figure 6:
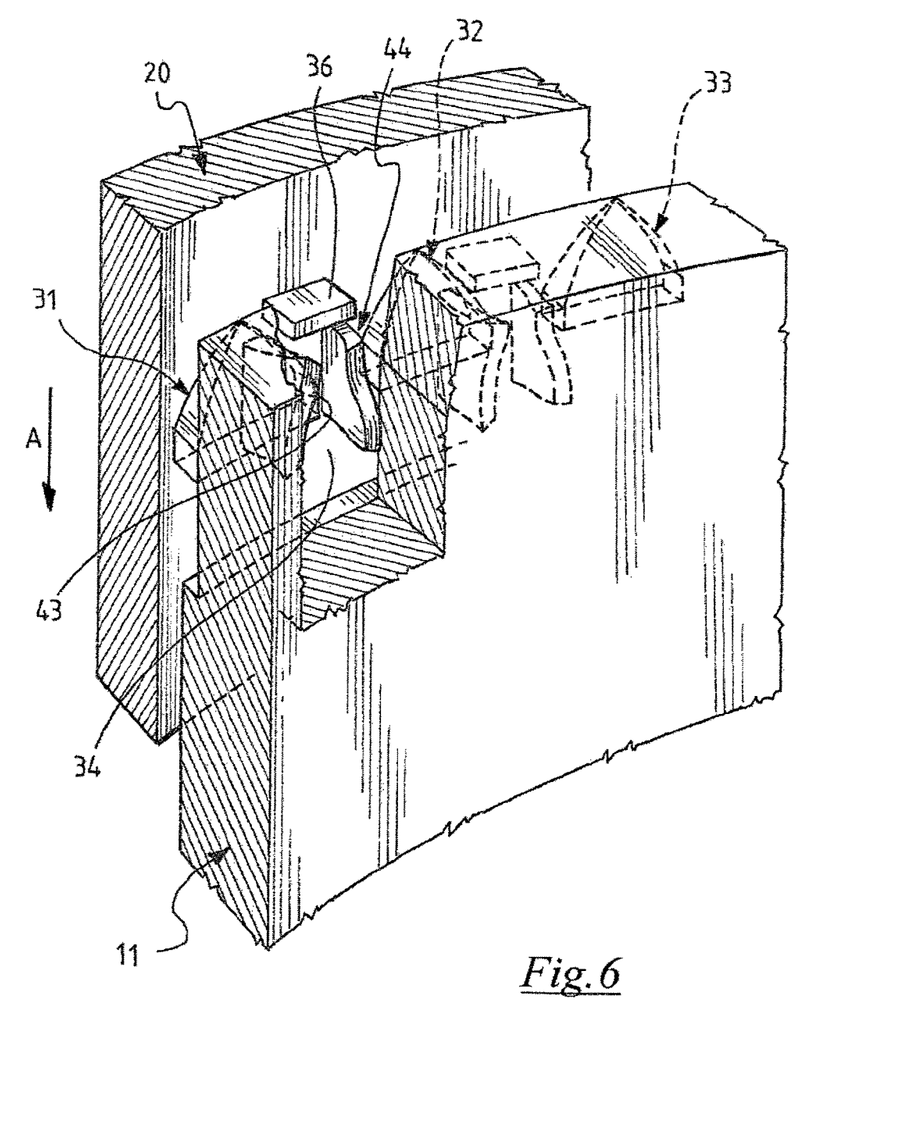
Figure 6A:
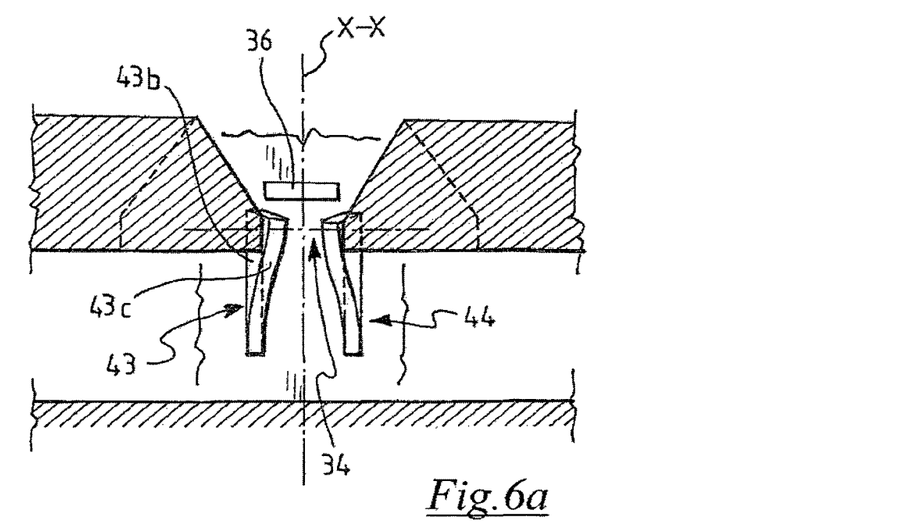
Figure 6B:
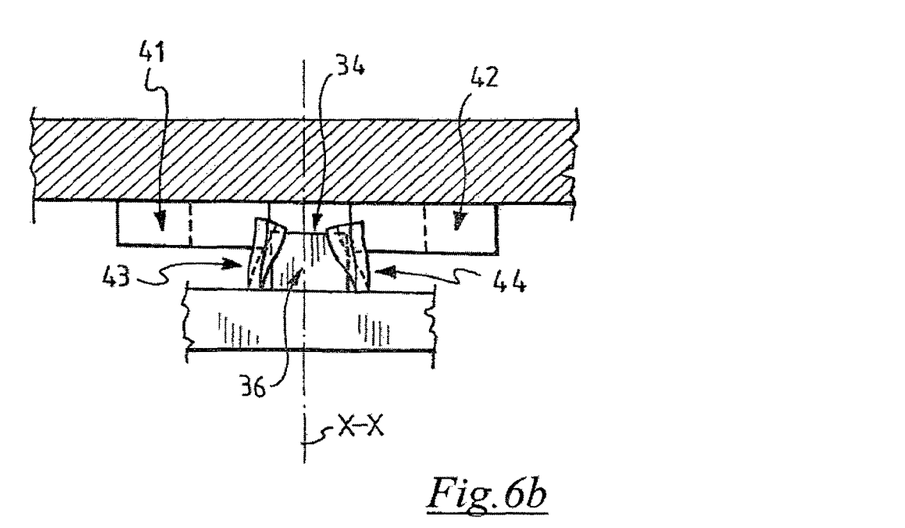
Figure 7:
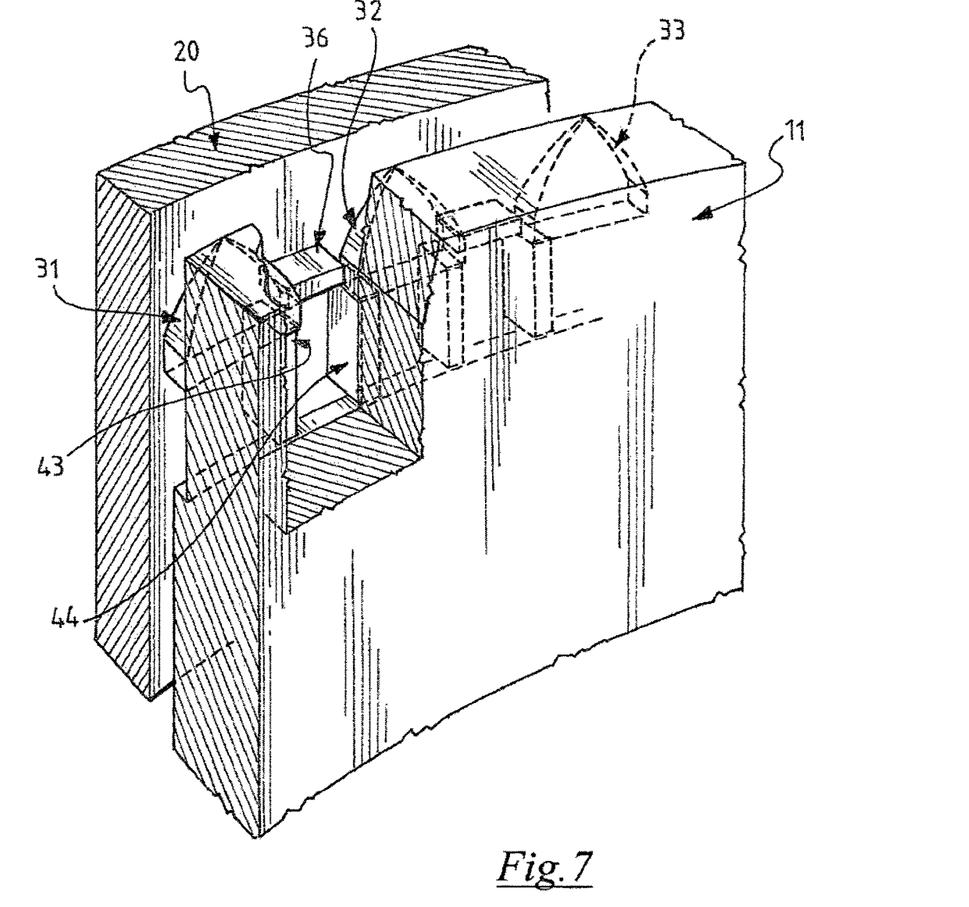
Figure 7A:
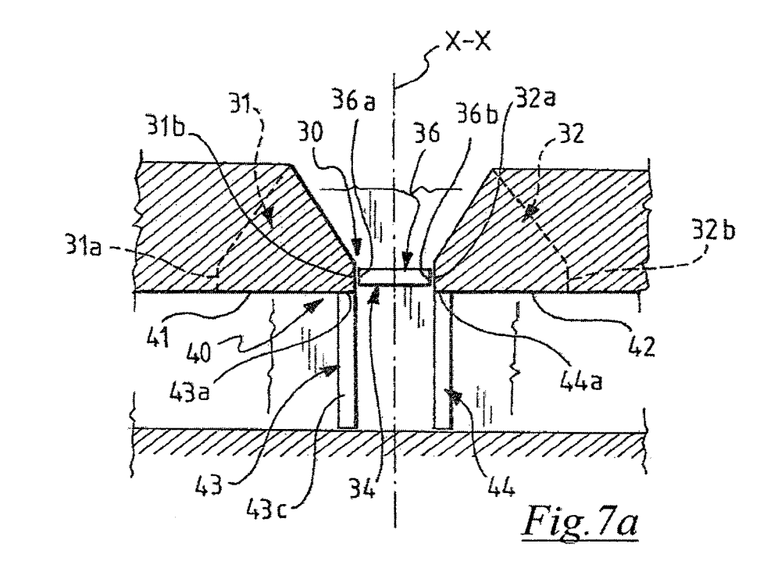
Figure 7B:
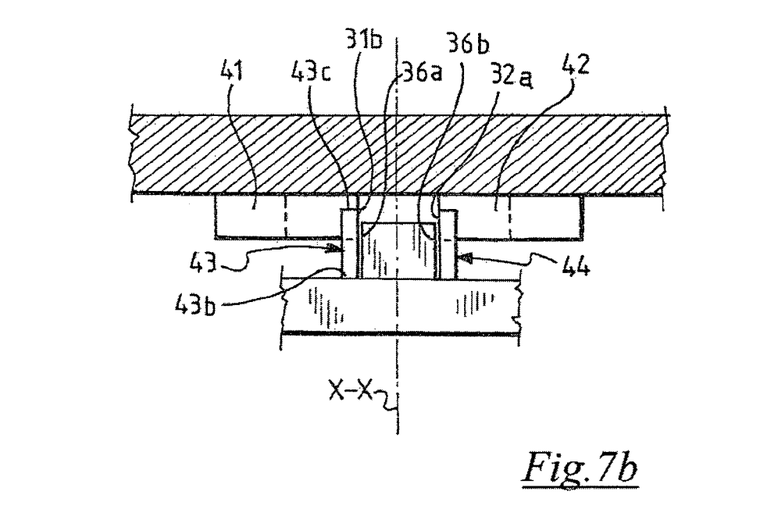

Even when this is not expressly stated, the individual features as described with reference to the particular embodiments shall be intended as auxiliary to and/or interchangeable with other features described with reference to other exemplary embodiments.

DETAILED DESCRIPTION

Referring now to the figures, numeral 1 generally designates a liquid container of the present invention.

The container 1 comprises a container body, whose upper portion is only shown, and which is referenced 10 in the figures, having a neck 11 and a mouth 12 defining an orifice 13. The neck 11 extends from the container body 10 along a longitudinal axis X-X and ends with the mouth 12. The neck 11 embodies a first tubular member.

Advantageously, the container body 10 is made of plastic, e.g. PET. Alternatively, the container body 10 may be also made of glass.

The container 1 comprises a second tubular member 20, at least one longitudinal portion thereof being disposed around the neck 11 and attached to such neck 11.

For simplicity, reference will be made hereinafter, without limitation, to the neck 11 and the tubular member 20 as first and second tubular members attached together by the attachment system of the present invention.

In this example, the tubular member 20 has an inner surface 21 facing the neck 11 and an outer surface 22.

Therefore, the tubular member 20 is coaxially disposed outside the neck 11 such that the tubular member 20 and the neck 11 lie one over the other along a longitudinal portion.

In an alternative embodiment, the first tubular member 11 and the second tubular member 20 define parts of a closure.

Advantageously, the tubular member 20 is made of plastic, e.g. PP or PC.

According to one embodiment, the tubular member 20 embodies a part of a closure designed to close the mouth 12, particularly the closure part that is designed to be attached to the neck 11. Alternatively, the tubular member 20 may embody a part of a pourer designed to be attached to the neck 11.

It should be noted that the tubular member 20 is attached to the neck 11 by translation of the tubular member 20 relative to the neck 11, along the longitudinal axis X-X and in the coupling direction referenced A in the figures, from a free position to an attached position. This assembly step, in which the tubular member 20 is attached to the neck 11 is known as capping.

In order to attach the tubular member 20 to the neck 11 and hold it attached thereto, the container 11 comprises rotational attachment members 30 for rotatably attaching the tubular member 20 to the neck 11, and longitudinal attachment members 40 for attaching the tubular member 20 to the neck 11 along the longitudinal axis X-X.

According to one embodiment, the longitudinal attachment members 40 are designed to provide an irreversible attachment along the longitudinal axis X-X in the direction of separation of the tubular member 20 from the neck 11 and vice versa.

The rotational attachment members 30 comprise a plurality of attachment elements formed on the neck 11 and angularly spaced along the neck 11 to define a plurality of seats between two successive attachment elements. For simplicity, reference will be made below to the three attachment elements 31, 32, 33 and two seats 34, 35 as shown in the figures. The seat 34 is defined by the two successive attachment elements 31, 32, whereas the seat 35 is defined by two attachment elements 32, 33. Each seat, e.g. the seat 34, is angularly delimited, on opposite sides, by two successive attachment elements, in this example the two attachment elements 31 and 32.

In other words, the attachment elements are adjacent along the neck 11 and separated by the seats defined by two successive attachment elements.

According to one embodiment, each seat is open at its top, at its bottom and externally, toward the tubular member 20. Therefore, the seat is angularly delimited by two successive attachment elements and internally delimited by the outer surface of the neck 11. Each seat extends angularly along a length L1.

The rotational attachment members 30 also comprise a plurality of reference elements formed on the tubular member 20, e.g. on the inner surface 21. These reference elements are angularly spaced along the tubular member 20 and are at least partially housed in respective seats of the attachment elements.

For simplicity, reference will be made below to the two reference elements 36, 37 as shown in the figures.

Each reference element cooperates with the two successive attachment elements defining the seat in which the reference element is at least partially accommodated for rotatably attaching the tubular member 20 to the neck 11. In this example the reference element 36 is partially housed in the seat 34 and cooperates with the two successive attachment elements 31, 32 that define the seat 34.

According to one embodiment, the attachment elements project out of the neck 11 toward the tubular member 20 and comprise two opposed attachment surfaces, in this example lying on planes parallel to the longitudinal axis X-X.

In this example, the attachment elements 31, 32 comprise two opposed attachment surfaces 31$a$, 31$b$ and 32$a$, 32$b$ lying on planes substantially parallel to each other and parallel to the longitudinal axis X-X.

Since the seat 34 is angularly delimited by the two attachment surfaces 31$b$ and 32$a$, these two attachment surfaces 31$b$, 32$a$ are found to be angularly spaced at a distance that is equal to the length L1 of the seat 34.

It shall be noted that the attachment surface 31$b$ of the attachment element 31 substantially faces the attachment surface 32$a$ of the next attachment element 32.

According to one embodiment, the reference elements project out of the tubular member 20, in this example the inner surface 21, toward the neck 11. Each reference element has two opposed reference surfaces engaged with respective attachment surfaces of two successive attachment elements.

In this example, the reference element 36 has two opposed reference surfaces 36$a$, 36$b$ engaged with the attachment surfaces 31$b$ to 32$a$ of the two successive attachment elements 31, 32. It shall be noted that this engagement prevents the rotation of the tubular member 20 relative to the neck 11, excepting residual clearances due to production tolerances.

Particularly, the reference element 36 angularly extends between the two reference surfaces 36$a$, 36$b$ along a distance L2 that is equal to or slightly smaller than the length L1 of the seat 34, in this example slightly smaller than the length L1 for proper, interference-free engagement.

According to one embodiment, each reference element comprises a projection that extends from the tubular member 20, in this example the inner surface 21, on a plane perpendicular to the longitudinal axis X-X.

Advantageously, the attachment elements are formed at the mouth 12 of the neck 11 of the container body 10.

The longitudinal attachment members 40 comprise a plurality of stop surfaces formed on the neck 11 and angularly spaced along the neck, and a plurality of abutment elements formed on the tubular member 20, e.g. on the inner surface 21.

Each abutment element extends along the axis X-X and cooperates with a respective stop surface for longitudinally attaching the tubular member to the neck 11.

For simplicity, reference will be made below to the two stop surfaces 41, 42 cooperating with two abutment elements 43, 44 as shown in the figures.

According to one embodiment, the stop surfaces 41, 42 are longitudinally offset, and in this example are placed below the attachment elements 31, 32, particularly below the attachment surfaces 31$a$, 31$b$, 32$a$, 32$b$, relative to the orifice 13.

Here, the abutment elements 43, 44 are also placed below the reference element 36.

In the example as shown in the figures, two abutment elements 43, 44 are placed below each reference element 36 and adjacent thereto.

The two abutment elements 43, 44 are angularly spaced along the tubular member 20 by the length L3 that is greater than the length L2, where such length L3 is measured as a minimum distance. Nevertheless, further configurations may be envisaged, in which the abutment elements 43, 44 are spaced at a smaller distance, as long as they at least partially engage their respective stop surfaces 41, 42.

According to one embodiment, the stop surfaces 41, 42 lie on a plane perpendicular to the longitudinal axis X-X.

In this example, the stop surfaces 41, 42 are defined by a portion of the attachment elements 31, 32, particularly by a portion of the lower surfaces of the attachment elements 31, 32.

According to one embodiment, the stop surfaces 41, 42 project out of the neck 11 toward the tubular member 20 and the abutment elements 43, 44 project out of the tubular member 20, in this example the inner surface 21, toward the neck 11.

In this example, the abutment elements 43, 44 radially project out of the tubular member 20, in this example the inner surface 21, and extend along the longitudinal axis X-X, advantageously on a plane parallel to the longitudinal axis X-X.

Each abutment element 43, 44 comprises an abutment surface 43a, 44a engaged with a respective stop surface 41, 42.

According to one embodiment, each abutment element, e.g. the abutment element 43, is defined by a tab attached to the tubular member 20, in this example the inner surface 21, at a base portion 43b. The tab 43 radially extends from the base portion 43b to an end portion 43c. Particularly, the tab 43 extends along the longitudinal axis X-X, advantageously on a plane parallel to the longitudinal axis X-X, between an upper portion, defined by the abutments surface 43a and a lower portion 43d.

Advantageously, at least part of the tab 43 is a elastically deformable along an axis Y-Y transverse to the longitudinal axis X-X. Advantageously, this part of the tab 43 comprises at least the end portion 43c. In this example, the entire tab 43 is elastically deformable.

Advantageously, the transverse axis Y-Y lies on a plane perpendicular to the longitudinal axis X-X.

More particularly,

According to one embodiment, each of the attachment element 31, 32 comprises two opposed lead-in surfaces 31c, 31d and 32c, 32d.

These lead-in surfaces 31c,31d and 32c,32d extends from the attachment surfaces 31a,31b and 32a,32b towards the orifice 13.

For example, the lead-in surface 31d extends from the attachment surface 31b.

Particularly, each lead-in surface extends on a plane that is inclined to the longitudinal axis X-X which, as mentioned above, corresponds to the direction in which the tubular member 20 is fitted onto the neck 11 during capping.

It shall be noted that, in the example as shown in the annexed figures, the rotational attachment members 30 and the longitudinal attachment members 40 are arranged to form a plurality of attachment assemblies arranged in angularly spaced relationship, where each attachment assembly comprises both members 30 and 40. According to a different embodiment, the rotational attachment members 30 may be alternated with the longitudinal attachment members 40. Here, the reference elements 36 will be alternated with the abutment elements 43, 44 on the tubular member 20. The attachment elements 31, 32 may also be alternated with the stop surfaces 41, 42 on the neck 11.

The assembly of the container 1 from a configuration in which the tubular member 20 is free from the neck 11 and hence not attached thereto will be now described. In this configuration, the tubular member 20 is released from the neck 11.

The tubular member 20 is coupled to the neck 11 by a coupling movement along the longitudinal axis X-X and in a coupling direction, referenced A in the figures. As the tubular member 20 is fitted along the longitudinal axis X-X and in the direction A, the abutment elements 43, 44, particularly the lower portions of the abutment elements 43, 44 come to engagement with the lead-in surfaces 31d, 32c respectively. This will allow the reference element 36 to be centered with respect to the seat 34 and hence to the attachment surfaces 31b,32a that delimit the seat 34 which are designed for engagement of the abutments surfaces 36a, 36b.

Due to the conformation of the lead-in surfaces 31d,32c and the elasticity of the abutment elements 43, 44, the abutment elements 43, 44 will progressively bend from the lower portion 43d to the upper portion 43a. Such bending will allow the end portion 43c of each abutment element 43 to pass through the seat 34 and hence the tubular member 20 to move relative to the neck 11 until the abutment elements 43, 44 fully snap underneath the stop surfaces 41, 42, thereby the abutment surfaces 43a, 44a engage the stop surfaces 41, 42 themselves. Such engagement prevents any translation of the tubular member 20 in the direction opposite to the fit-on direction A. Typically, the container 1 has members that can also stop the translational movement of the tubular member 20 in the direction A at the longitudinal position in which the abutments surfaces 43a,44a engage the stop surfaces 41, 42. These members may consist of a ridge formed on the neck 11, for abutment of a portion of the tubular member 20, typically the lower end edge of the tubular member 20 or, as shown in the figures, the lower portions of the abutment elements 43, 44 or a flange of the pourer abutting the mouth 12.

At the same time as longitudinal attachment is provided by the engagement of the abutment elements 43, 44 with the stop surfaces 41, 42, the abutment surfaces 36a,36b of the reference element 36 engage the attachment surfaces 31b, 32a that delimit the seat 34 to rotatably attach the tubular member 20 to the neck 11.

Therefore, the attachment system of the present invention was found to fulfill the above mentioned objects.

Those skilled in the art will obviously appreciate that a number of changes and variants may be made to the arrangements as described hereinbefore to meet incidental and specific needs.

For example, unless otherwise imposed by evident technical limitations, any feature described in a preferred embodiment may be clearly used in another embodiment, with appropriate adaptations.

Likewise, the continuity of the components of the tubular member may be broken in any manner, as long as no functional alteration to the relevant component is caused thereby.

Also, slight tapers may be imparted to the portions described above as having an annular, cylindrical shape, in response to technological requirements.

All the changes will fall within the scope of the invention, as defined in the following claims.

The invention claimed is:

1. An attachment system for attaching two tubular members, comprising:
    a first tubular member extending along a longitudinal axis,
    a second tubular member extending along the longitudinal axis, and attached to the first tubular member,
    rotational attachment members for rotatably attaching the first tubular member to the second tubular member, longitudinal attachment members for attaching the first tubular member to the second tubular member in the longitudinal axis, wherein:

the rotational attachment members comprise:

a plurality of attachment elements formed on the first tubular member and arranged in angularly spaced relationship along the first tubular member to define a plurality of seats between two successive attachment elements, each seat being angularly delimited at its opposite sides by two successive attachment elements, a plurality of reference elements formed on the second tubular member, and arranged in angularly spaced relationship along the second tubular member and at least partially housed in respective seats of the attachment elements, each reference element cooperating with the two successive attachment elements defining the seat in which the reference element is at least partially housed, for rotatably attaching the first tubular member to the second tubular member, the longitudinal attachment members comprise:

a plurality of stop surfaces formed on the first tubular member and arranged in angularly spaced relationship along the first tubular member, a plurality of abutment elements formed on the second tubular member, each abutment element extending along the longitudinal axis and cooperating with a respective stop surface for longitudinally attaching the first tubular member and the second tubular member, each abutment element being defined by a tab attached to the second tubular member at a base portion thereof, the tab radially extending from the base portion to an end portion and being elastically deformable along a transverse axis that is transverse to the longitudinal axis, the tab extending along the longitudinal axis between an upper portion and a lower portion, the upper portion of the tab engaging with a respective stop surface, wherein from a configuration in which the tubular member is released from the first tubular member, the second tubular member is coupled to the first tubular member by a coupling movement along the longitudinal axis and in a coupling direction, the tab progressively bends from the lower portion toward the upper portion during the coupling movement, the end portion of the tab passes through the respective seat and the second tubular member moves relative to the first tubular member until the upper surface of the tab engages the respective stop surface thereby preventing any translation of the second tubular member relative to the first tubular member in a direction opposite to the coupling direction.

2. The attachment system as claimed in claim 1 wherein, from a configuration in which the second tubular member is released from the first tubular member, the second tubular member is coupled to the first tubular member by a coupling movement along the longitudinal axis and in a coupling direction, the tab progressively bending from the lower portion toward the upper portion during the coupling movement.

3. The attachment system as claimed in claim 1, wherein: the attachment elements project out of the first tubular member toward the second tubular member and comprise two opposed attachment surfaces, the reference elements project out of the second tubular member toward the first tubular member, each reference element having two opposed reference surfaces engaging with respective attachment surfaces of two successive attachment elements.

4. The attachment system as claimed in claim 1, wherein the stop surfaces are arranged in longitudinally offset relationship to the attachment elements.

5. The attachment system as claimed in claim 1, wherein each attachment element comprises two opposed lead-in surfaces.

6. The attachment system as claimed in claim 1, wherein the first tubular member and the second tubular member define parts of a closure for a liquid container.

7. The attachment system as claimed in claim 1, wherein the longitudinal attachment members are designed to provide an irreversible attachment along the longitudinal axis in the direction of separation of the first tubular member from the second tubular member and vice versa.

8. A liquid container comprising:

a container body having a neck, the neck extending from the container body along a longitudinal axis and ending with a mouth that defines an orifice, a tubular member, particularly of a closure or a pourer, disposed around the neck, attached to the neck and having an inner surface facing the neck and an outer surface, rotational attachment members for rotatably attaching the tubular member to the neck, longitudinal attachment members for attachment of the tubular member to the neck along the longitudinal axis, characterized in that:

the rotational attachment members comprise:

a plurality of attachment elements formed on the neck and arranged in angularly spaced relationship along the neck to define a plurality of seats between two successive attachment elements, each seat being angularly delimited at its opposite sides by two successive attachment elements, a plurality of reference elements formed on the inner surface of the tubular member, and arranged in angularly spaced relationship along the tubular member and at least partially housed in respective seats of the attachment elements, each reference element cooperating with the two successive attachment elements that define the seat in which the reference element is at least partially housed, for rotatably attaching the tubular member to the neck, the longitudinal attachment members comprise:

a plurality of stop surfaces formed on the neck and arranged in angularly spaced relationship along the neck, a plurality of abutment elements formed on the inner surface of the tubular member, each abutment element extending along the longitudinal axis and cooperating with a respective stop surface for longitudinally attaching the tubular member to the neck, each abutment element being defined by a tab attached to the inner surface of the tubular member at a base portion thereof, the tab radially extending from the base portion to an end portion the tab being elastically deformable along a transverse axis that is transverse to the longitudinal axis, the tab extending along the longitudinal axis between an upper portion and a lower portion, the upper portion of the tab engaging with a respective stop surface, wherein from a configuration in which the tubular member is released from the neck, the tubular member is coupled to the neck by a coupling movement along the longitudinal axis and in a coupling direction, the tab progressively bends from the lower portion toward the upper portion during the coupling movement, the end portion of the tab passes through the respective seat and the tubular member moves relative to the neck until the upper surface of the tab engages the respective stop surface thereby preventing any translation of the tubular member relative to the neck in a direction opposite to the coupling direction.

9. The container as claimed in claim 8, wherein:
the attachment elements project out of the neck toward the tubular member and comprise two opposed attachment surfaces, lying on planes parallel to the longitudinal axis,
the reference elements project out of the inner surface of the tubular member toward the neck, each reference element having two opposed reference surfaces, engaging with respective attachment surfaces of two successive attachment elements.

10. The container as claimed in claim 8, wherein the longitudinal attachment members are designed to provide an irreversible attachment in the longitudinal direction in the direction of separation of the tubular member from the neck and vice versa.

* * * * *

UNITED STATES PATENT AND TRADEMARK OFFICE
CERTIFICATE OF CORRECTION

PATENT NO. : 10,099,825 B2
APPLICATION NO. : 14/652030
DATED : October 16, 2018
INVENTOR(S) : Luca Viale et al.

It is certified that error appears in the above-identified patent and that said Letters Patent is hereby corrected as shown below:

On the Title Page

Item (73) Assignee:
"Gruppo Cimbali S.p.A."

Should be:
--Guala Closures S.p.A.--

Signed and Sealed this
Fifth Day of May, 2020

Andrei Iancu
*Director of the United States Patent and Trademark Office*